United States Patent
Lagally et al.

(10) Patent No.: US 12,426,611 B2
(45) Date of Patent: *Sep. 30, 2025

(54) AUTOMATED MEAT ANALOGUE PRODUCTION SYSTEMS

(71) Applicant: Seattle Food Tech, Inc., Seattle, WA (US)

(72) Inventors: Christie Lagally, Seattle, WA (US); Julia O'Donnell, Seattle, WA (US); Jeffray Behr, Burlington (CA); Chloe Grubb, Seattle, WA (US); Margaret Rosner, Tacoma, WA (US)

(73) Assignee: Seattle Food Tech, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,963

(22) Filed: Mar. 15, 2024

(65) Prior Publication Data

US 2024/0215609 A1    Jul. 4, 2024

Related U.S. Application Data

(63) Continuation of application No. 18/108,406, filed on Feb. 10, 2023, now Pat. No. 12,075,798, which is a
(Continued)

(51) Int. Cl.
*A23J 3/22*    (2006.01)
*A21C 1/00*    (2006.01)
(Continued)

(52) U.S. Cl.
CPC .............. *A23J 3/14* (2013.01); *A23D 7/0053* (2013.01); *A23D 7/05* (2013.01); *A23J 3/227* (2013.01);
(Continued)

(58) Field of Classification Search
None
See application file for complete search history.

(56) References Cited

U.S. PATENT DOCUMENTS 3,498,793 A * 3/1970 Dechaine ................. A23L 11/07
426/802
3,999,474 A * 12/1976 Sienkiewicz ............ A23J 3/227
426/802

(Continued)

FOREIGN PATENT DOCUMENTS

| JP | 2011512839 A | 4/2011 |
| WO | 2009114077 A1 | 9/2009 |
| WO | WO-2022086422 A1 * | 4/2022 | ........... A23D 7/0053 |

OTHER PUBLICATIONS

Office Action received in Japanese application No. 2023-532559, mailed on Jun. 11, 2024.
(Continued)

*Primary Examiner* — John J DeRusso
(74) *Attorney, Agent, or Firm* — Cognition IP, P.C.; Edward Steakley; Justin White

(57) ABSTRACT

Systems and methods describe improvements in the automated production of meat analogues. Ingredients are provided, including oil, water, binding agent(s), and one or more forms of protein to be separately and continuously conveyed through a facility. Concurrently to the ingredients being conveyed through the facility, a number of actions occur. The system emulsifies the oil, water, and binding agent(s) within an emulsifying machine to form a final emulsion. A hydration process is separately applied to at least one of the forms of protein. The system mixes and conveys the protein(s) with the final emulsion in a final mixer to form a final dough.

19 Claims, 4 Drawing Sheets

Related U.S. Application Data continuation of application No. 17/518,544, filed on Nov. 3, 2021, now Pat. No. 11,606,959.

(60) Provisional application No. 63/118,597, filed on Nov. 25, 2020.

(51) Int. Cl.
| | |
|---|---|
| *A23D 7/005* | (2006.01) |
| *A23D 7/05* | (2006.01) |
| *A23J 3/14* | (2006.01) |
| *A23L 29/262* | (2016.01) |
| *A23L 33/185* | (2016.01) |
| *A23L 35/00* | (2016.01) |

(52) U.S. Cl.
CPC ............ *A23L 29/262* (2016.08); *A23L 33/185* (2016.08); *A23L 35/10* (2016.08); *A21C 1/003* (2013.01)

(56) References Cited

U.S. PATENT DOCUMENTS

| | | | |
|---|---|---|---|
| 7,556,836 | B2 | 7/2009 | Mueller et al. |
| 11,432,564 | B2* | 9/2022 | Lagally ............... B01F 27/62 |
| 11,432,565 | B2* | 9/2022 | Lagally ............... A22C 7/0092 |
| 11,606,959 | B2* | 3/2023 | Lagally ............... A23D 7/05 |
| 12,004,536 | B2* | 6/2024 | Lagally ............... B01F 27/70 |
| 12,075,798 | B2* | 9/2024 | Lagally ............... A23L 35/10 |
| 12,102,101 | B2* | 10/2024 | Lagally ............... B29C 48/29 |
| 2005/0276903 | A1* | 12/2005 | Morin ............... B01F 27/702 |
| | | | 426/646 |
| 2015/0296867 | A1 | 10/2015 | Mazer et al. |
| 2018/0064137 | A1 | 3/2018 | Trottet et al. |
| 2024/0284935 | A1* | 8/2024 | Lagally ............... A23J 3/26 |

OTHER PUBLICATIONS

Extended European Search Report received in European application No. 21898901.0, mailed on Sep. 24, 2024.

* cited by examiner

AUTOMATED MEAT ANALOGUE PRODUCTION SYSTEMS

CROSS-REFERENCE TO RELATED APPLICATIONS

This application is a continuation of and claims priority to U.S. patent application Ser. No. 18/106,406, filed Feb. 10, 2023, which claims priority to U.S. patent application Ser. No. 17/518,544, filed Nov. 3, 2021, now U.S. Pat. No. 11,606,959, which in turn claims priority to U.S. Provisional Patent Application No. 63/118,597, filed Nov. 25, 2020, all of which are hereby incorporated by reference in their entireties herein. This application is also related to U.S. patent application Ser. No. 17/518,513, and U.S. patent application Ser. No. 17/518,499, now U.S. Pat. No. 11,432,565, both filed Nov. 3, 2021.

TECHNICAL FIELD

The present disclosure relates generally to food processing, and more particularly to devices and methods used in the production of meat analogue products.

BACKGROUND

Plant-based meat production is a growing industry, and plant-based meat products are becoming increasingly popular due to the improving quality and appeal of these products. While the potential market for plant-based meat is growing, there are several issues within the production of plant-based meat which account for the small size of the plant-based meat industry in comparison to competition in the animal meat sector. Specifically, the production of plant-based meat as well as analogue meat in general is currently characterized by high prices, low volume, and/or inconsistent quality. While many factors feed these issues, production methods and equipment are central to scalability, quality control, and the cost of the goods. In contrast, while the chicken industry has standardized and optimized the slaughter and deconstruction of chicken into chicken products since the 1960's, no such full scale standardization nor optimization has been attempted with analogue meat production, including plant-based meat production.

There are several critical production and equipment inefficiencies which can be identified for plant-based meat. Currently, the majority of plant-based meat is produced using batch-based "mix and form" methods, wherein large batches of ingredients are kept together and mixed throughout as they are hydrated, emulsified, and further processed. As a result of batch-based mix and form methods, the highly viscous materials created during production of the plant-based meat must be mixed vigorously within a large batch mixer in large volumes/quantities. When batch processing is performed with large mixing tools, an excessive amount of heat is generated during the mixing of the high viscous materials such as plant-based meat dough. This can result in a variety of food chemistry problems which may cause dry and unpalatable finished products. This condition also adversely impacts quality of the texture, flavor, and palatability of the final product. This undesirable heating condition may not be noticeable to producers at small scales, as the impact of high-viscous mixing is amplified by production in higher volumes.

Large-scale batch mixing further risks quality in terms of non-uniform mixing, such as leaving dry powder spots which are difficult to see in a huge vat. Non-uniform mixing caused by "dead zones" in large mixers is a well-documented issue and limits the feasible size of each batch, which thus requires serial manufacturing (or higher capital investment in multiple mixers for parallel manufacturing). For each of these batches, precisely measuring out all the ingredients is a labor- and time-intensive process, thus compounding the process inefficiencies of batch manufacturing.

Furthermore, plant-based meat producers often use the same food production equipment as producers of actual meat products. Just as in meat products, plant-based meat products made using this equipment must be processed in chilled, refrigerated facilities, typically 40 degrees Fahrenheit or lower, to control pathogen growth in the "meat" substrate (hereinafter "dough") during processing. In the case of plant-based meat, chilled environment processing is needed for better formation of the ingredients and to achieve the right texture and food chemistry within the dough. However, some experimental results show that facility chilling is insufficient to change the temperature of plant-based meat dough that has been heated during processing steps referenced above and therefore may not be effective for pathogen control during production of plant-based meat dough once the process is scaled to larger batches. Further, such refrigerated environments are exceptionally costly to operate and maintain, and this environment is extremely physically demanding on production workers. Additionally, a refrigerated environment may promote the spread of human-borne pathogens, such as coronaviruses, among workers. Studies of coronavirus inactivation rates in environments with varying ambient temperature and relative humidity suggest that these pathogens, and perhaps others, may be spread more readily in a low-temperature, low-moisture environment such as a refrigerated food production facility.

In addition, due to the highly viscous nature of the ingredients which have been created in the plant-based meat production process, large bowl mixers and other mixing tools containing large batches of the material must be scooped in and out manually or with mechanical assistance by production workers. In order to add the ingredients, workers must lift heavy buckets into the mixing tools. Because the bulk of the weight of the dough is water in manually-prepared ingredients (e.g., water in an oil-water emulsion and hydrated protein), lifting the ingredients to fill the mixers is especially difficult. This task is labor intensive and dangerous for such workers because it risks arm and back related injuries to the worker or entanglement with mechanical assistance machinery. Overall, the production of plant-based meat dough is labor intensive and is subject to technician variation and/or error in the operation of processing tools.

Thus, there is a need in the field of food processing to create new and useful systems and methods for the automated production of meat analogues, including plant-based meat. The source of the problem, as discovered by the inventors, is a lack of a continuous or near-continuous flow process utilizing automated production equipment to produce plant-based meat and meat analogues generally.

SUMMARY

It is an advantage of the present disclosure to provide improved systems and methods for the automated production of meat analogues. The disclosed features, apparatuses, systems, and methods provide production of meat analogues at significantly lower costs, higher efficiency, and with better end results in terms of taste and texture, compared to batch-based processes. These advantages can be accomplished at least in part by providing a new process for producing meat analogues which eschews the batch-based mix and form processing of the current state of meat analogue production, in favor of isolating and separating ingredients during production, and continuously conveying those ingredients during preparatory processing before continuous-flow mixing. The result of this new process is that the ingredients move through several steps of the production process without being mixed all at once. The benefit of this new process is that ingredients can be separately processed under the conditions ideal for individual ingredient combination subsets, and then scaled in a fashion that maintains this processing in isolation from materials which do not require another processing effort. As a result, the ingredients only come together in a final mixer at a later step of processing after which all subsets of ingredients have been properly handled in separate feeder lines into this system. This avoids extraneous processing that would otherwise unnecessarily add heat to the ingredients with no other processing benefit, thereby avoiding quality problems that result from excessive heat in the dough. In addition, the new process differs from the current production process in that the facilities where it takes place need not be refrigerated or chilled. Rather, chilling occurs at individual stages of subset processing which are local to specific ingredients, and at the final mixing stage. Processing in an ambient facility (i.e., a facility that is neither refrigerated, nor chilled, nor cooled aside from providing a comfortable work environment) leads to substantial cost reductions for plant operations and increased worker comfort. Localized chilling ensures effectiveness of refrigeration applications to keep materials at proper temperatures for processing and quality control.

In the new process, the system provides ingredients including oil, water, binding agent(s) (such as methylcellulose), and one or more forms of protein (potentially both dry textured protein and dry powdered protein), to be separately and continuously conveyed through a facility (such as, e.g., a food production facility). Concurrently to the ingredients being conveyed through the facility, a number of actions occur. In some embodiments, a chilling process is separately applied to the water and/or the oil. A hydration process is separately applied to at least one of the forms of protein. The system emulsifies the oil, water, and binding agent(s) within an emulsifying machine to form a final emulsion (such as, e.g., a low-viscosity gel final emulsion). This action may be multi-stage, including a process such as, e.g.: the pre-dispersal of the one or more binding agents within the oil before mixing with water; or pre-mixing the oil and water to form an unstable suspension, before mixing with the one or more binding agents; or mixing the oil, water, and one or more binding agents together in one step. The system mixes and conveys the final emulsion, hydrated proteins, and potentially additional powdered ingredients (such as dry powdered protein, binder, seasoning) in a final mixer to form a cohesive final dough. In some embodiments, a chilling system (such as, e.g., a chiller and cooling jacket) is used to maintain the temperature of ingredients and final dough throughout the various stages of the process where necessary for a particular recipe. Such a chilling system may be integrated with one or more components of the system at various stages of the process (e.g., integrated with or surrounding a feeding hopper, pre-mixer, hydration or mixing equipment, or any other suitable component of the system). The system may optionally be configured for monitoring and/or control of feed flow, monitoring and/or control of the temperature of ingredients, and/or other monitoring or control aspects.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed methods and apparatuses for progressive hydration. These drawings in no way limit any changes in form and detail that may be made to the disclosure by one skilled in the art without departing from the spirit and scope of the disclosure.

DETAILED DESCRIPTION

Figure 1:
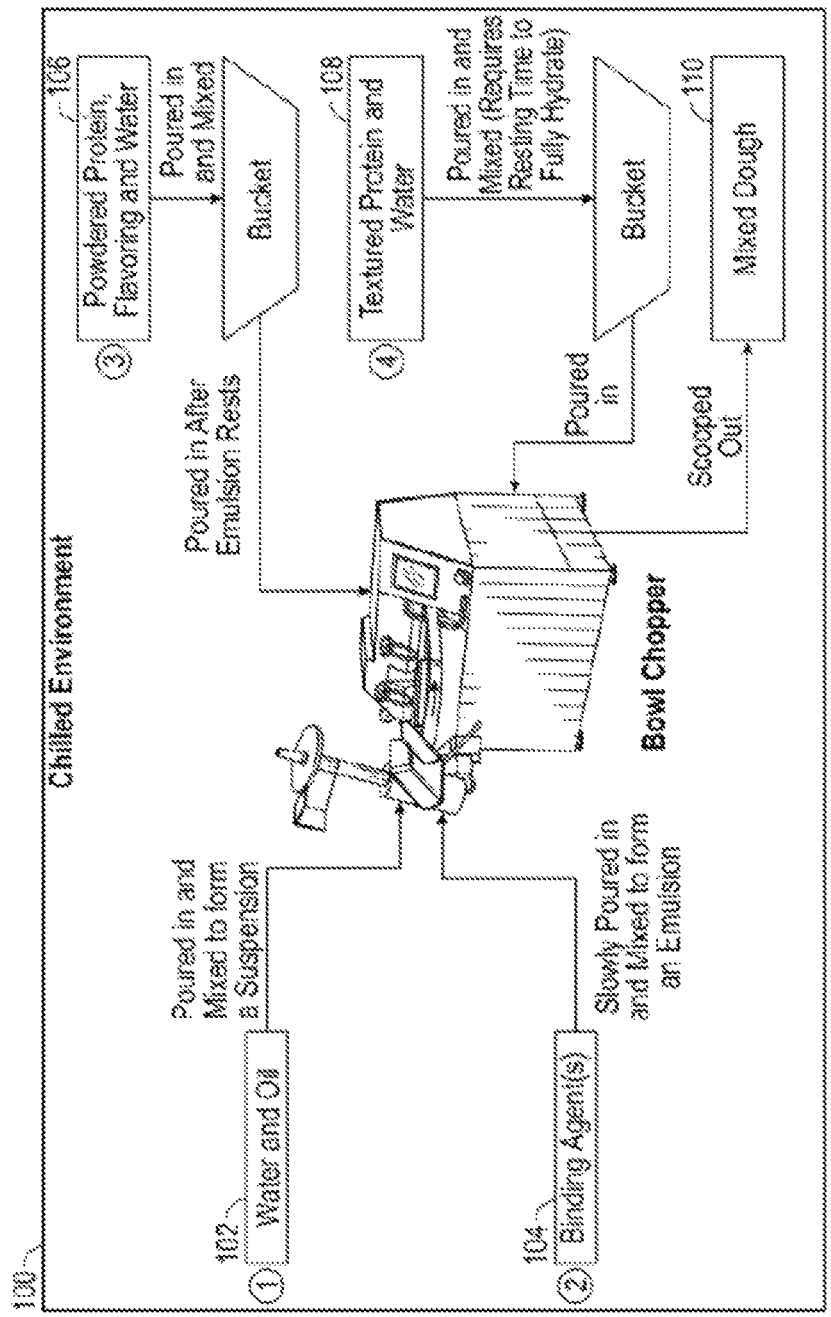
FIG. 1 illustrates a schematic view of a prior art process for meat analogue production.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for the production of meat analogues, such as, e.g., plant-based meat, meatless burgers, chicken nuggets, and other similar vegetarian or vegan foodstuff which does not contain meat in its ingredients. The disclosed embodiments can be used for preparing, processing, hydrating, emulsifying, and/or mixing various ingredients of plant-based meat, including proteins such as, e.g., textured soy protein or soy protein isolate as well as similar plant-based proteins from other plant sources in a similar form (e.g., pea protein and fava bean protein).

In some embodiments, the system can utilize a hydration component for plant-based proteins. In some embodiments, the hydration component efficiently processes the material while concurrently hydrating it continuously and progressively. In some embodiments, the hydration component also concurrently conveys the material while it is being hydrated and/or processed.

In some embodiments, material such as textured vegetable protein is provided to be conveyed through a material passage between a pair of nested cylinders, where an inner cylinder or shaft rotates to agitate and convey the material. In some embodiments, the material is then processed via a series of particle resizing features extending along the material passage. Such particle resizing features may be, e.g., blades, blunt-shaped teeth, screw threads, flutes, or similar protrusions extending from the inner cylinder or shaft. While the material is conveyed through the material passage, the particle resizing features can process, e.g., shred, shear, and/or chop the material into smaller material particles. At the same time, water is metered into the material passage while post-processing continues, resulting in the material particles being continuously and progressively hydrated during the post-processing step. In some embodiments, the end result is a more fibrous material which more closely resembles the texture and taste of meat than previous solutions could provide, with a more consistent size for each material particle leading to more uniform results.

In some embodiments, material such as texturized protein is conveyed through a stationary exterior tube with a rotating inner shaft, which holds one or more progression features (such as, e.g., an auger). In some embodiments, one or more bodies for shear crushing may additionally be present. In various embodiments, the shear crushing bodies may be offset cams, solid or sectioned spheroids, ribbed beaters, or any other suitable bodies for shear crushing. In some embodiments, material may be crushed and/or sheared between the flutes of the conveying auger and one or more additional surfaces. These shear crushing surfaces may comprise flutes of a partial or full shearing auger, or stationary protrusions such as fins from the exterior tube into the material passage. In some embodiments, water is concurrently added via one or more hydration ports which are configured to provide a metered flow rate of incoming water.

In some embodiments, material such as texturized protein is conveyed through a stationary exterior tube with a rotating inner shaft, which holds one or more agitation and/or progression features (such as, e.g., an auger). In some embodiments, the shaft oscillates in rotation (such as, e.g., two rotations clockwise followed immediately by one rotation counterclockwise). In some embodiments, water is concurrently added via one or more hydration ports which are configured to provide a metered flow rate of incoming water.

In some embodiments, the system provides for the emulsification of ingredients such as water, oil, and binding agents. In some embodiments, this is accomplished by progressively imparting shear stresses onto fluids in order to bind them during processing. In some embodiments, this is accomplished by first mixing together and dispersing the binding agent(s) within the oil; then adding water in a high-speed high-shear continuous mixer (such as, e.g., a homogenizer or colloid mill). In some embodiments, this is accomplished by first mixing together the oil and water to form an unstable suspension, then adding the binding agent(s) under conditions of high shear and turbulent mixing. In some embodiments, the oil, water, and binding agent(s) are all mixed together. In some embodiments, additional binding agent(s) may be added during the final dough mixing stage.

Although various embodiments disclosed herein discuss the preparation and processing of textured soy protein, soy protein isolate, and other plant-based proteins intended to be used in meat analogue production, it will be readily appreciated that the disclosed features, apparatuses, systems, and methods can similarly be used for any relevant ingredients to be used in food production. For example, the disclosed system may also be used with plant-based proteins in powdered or other forms other than texturized form, or potentially with some meat-based proteins or other non-plant-based proteins. In some embodiments methylcellulose is used as a binder, but in other embodiments other binders may be used, such as, e.g., soy lecithin, potato starch, or citrus fiber. In some situations, the disclosed automated processes and systems can also be used to hydrate and process materials that are not foodstuff-based. Other applications, arrangements, and extrapolations beyond the illustrated embodiments are also contemplated.

Referring to FIG. 1, a schematic view of a prior art process for meat analogue production is illustrated according to some embodiments of present invention. The prior art process illustrates one previous or current way of producing meat analogues in a food production facility.

The bowl chopper 100 in the prior art process is a tool utilized for emulsifying, chopping, and mixing ingredients in a batch-based process. Water and oil 102 are poured into the bowl chopper 100 and mixed to form a suspension. Next, one or more binding agent(s) 104 are slowly poured into the bowl chopper 100 and chopped to form an emulsion. Concurrently, powdered protein and seasonings and water 106 are poured into a bucket, mixed and hydrated well, then poured into the bowl chopper 100 following a resting period for the emulsion. Textured protein and water 108 are then poured into a bucket, mixed and allowed time to fully hydrate, then poured into the bowl chopper 100. Finally, the combined ingredients are mixed together in the bowl chopper 100 and the resulting mixed dough 110 is scooped out manually by workers to be formed (e.g., into the shape of a chicken nugget) and further prepared as a plant-based meat product.

Within this prior art process, ingredients follow the batch-based mix and form method, which essentially involves preparing some ingredients manually, then putting all ingredients into a large bowl chopper and mixing them together. This involves emulsifying oil, water, and one or more binding agents (such as, e.g., methylcellulose); preparing ingredients manually (including hydrating textured protein and/or powdered protein, and, in some embodiments, pre-mixing flavorings with protein); and finally, mixing everything together in the bowl chopper, as a batch process. The ingredients get mixed together as a homogeneous mixture as new ingredients are poured in. If all ingredients are poured in at once, and/or are not properly manually prepared, chemical reactions critical to the final dough structure are performed suboptimally. As a result, for example, water can be leached from textured soy protein to the methylcellulose or other binding agent, leading to suboptimal binding and inhomogeneous hydration. To avoid such an issue, individual ingredients are in some cases manually prepared separately, slowly added to the bowl and processed sequentially. This causes bottlenecks and necessitates batch processing upstream as well, which further exacerbates the inefficiencies within the system.

As an additional challenge, the bowl chopper does not provide for smooth material conveyance to the next production stage; rather, production workers must manually scoop the final dough ingredients to the next processing component, which is difficult as this material is often dense, highly viscous, and extremely sticky. (While material conveyance options exist for large bowl choppers, they are designed for animal meat products, and usually cannot accommodate such dense, viscous, and sticky material as plant-based meat dough.) Also, there is no separate chilling stage or other temperature control for individual ingredients; instead, the entire facility is chilled or refrigerated in order to process the ingredients. This ambient chilling is not only exceedingly energy-intensive, but also inefficient to cool plant-based meat dough material. Furthermore, ambient chilling can lead to an increased rate of infection for human-transmissible airborne viruses and other contagions, as well as creating an uncomfortable environment in which workers must endure the cold for long shifts, among other concerns.

Figure 2:
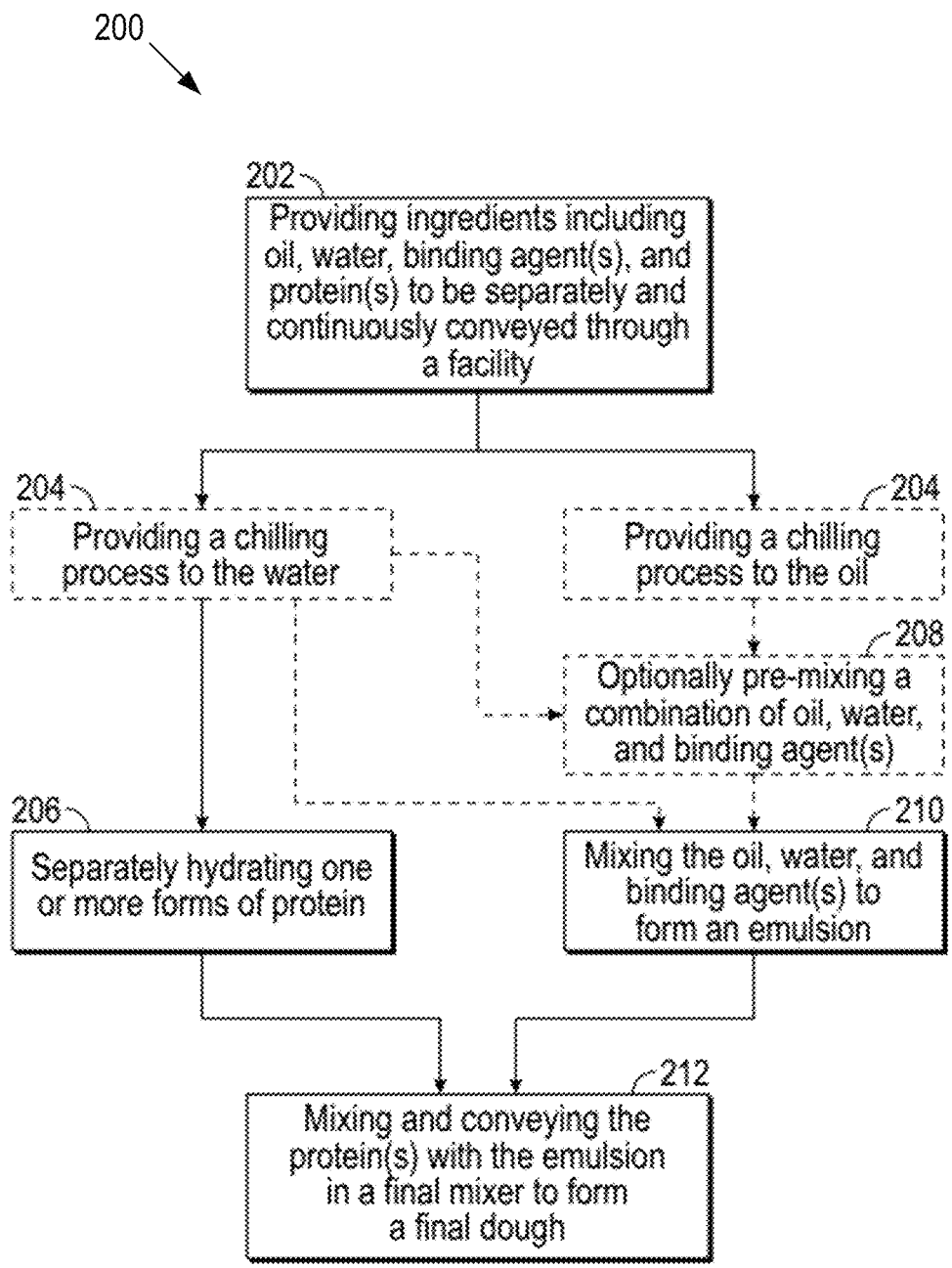
FIG. 2 illustrates a flowchart of an example method of providing automated meat analogue production.

FIG. 2 illustrates a flowchart of an example method 200 of providing automated meat analogue production, in accordance with some embodiments.

At step 202, the system provides ingredients including oil, water, one or more binding agent(s), and one or more forms of protein to be separately and continuously conveyed through a facility, such as, e.g., a food production facility. In some embodiments, the one or more binding agent(s) may include methylcellulose, citrus fiber, or any other suitable form of emulsification agent associated with meat analogues or plant-based meat. In some embodiments, the one or more forms of protein may be textured protein, protein isolate, powdered protein, or any other suitable form of protein associated with meat analogues or plant-based meat.

In some embodiments, the system is configured to provide the oil via an oil reservoir. The oil reservoir may be any reservoir, tank, or other container storing oil. The oil may be any oil used in food products, such as canola oil or vegetable oil. In some embodiments, the oil is pumped from the oil reservoir into the next component in the system. The oil is separate and isolated from other ingredients within the system.

In some embodiments, the oil reservoir may be sized according to the amount of oil required during a certain period of continuous production, and one or more binding agent(s) may be added to the reservoir. The oil and binding agent(s) may be actively stirred, continuously or intermittently, such that the binding agent(s) remain(s) uniformly suspended in the oil, forming a slurry. In some embodiments, this slurry is pumped from the reservoir into the next component in the system.

In some embodiments, the system is configured to provide the water via standard city/building water plumbing in the facility. In some embodiments, the system is configured to provide the water via a water reservoir. The water reservoir may be any reservoir, tank, or other container storing water. In some embodiments, the water may be some form of filtered water or other water to be used in food production. In some embodiments, the water is pumped from the water reservoir into the next component in the system. The water is separate and isolated from other ingredients within the system.

In some embodiments, the system is configured to provide the forms of protein via one or more continuous feeders with integrated material storage hoppers. For example, textured soy protein may be dispensed from a feeder associated with that textured soy protein, and soy protein isolate may be dispensed via a powdered soy protein feeder. In some embodiments, the feeder allows for the protein to be dispensed into the next component, and may allow for the protein to be metered at a specific desired volumetric or gravimetric flow rate. In some embodiments, these feeders may be gravimetric ("loss-in-weight") feeders with integrated control systems, such that the feeders continually output a constant mass-flow rate of material. In some embodiments, these feeders may be volumetric, such that the feeders are set to output a nominally-constant volume-flow rate of material. In some embodiments, these feeders may be vibratory feeders or screw feeders.

In some embodiments, the ingredients are conveyed through the facility via any suitable means of conveyance within a food production environment. For example, the ingredients may be conveyed via one or more conveyor belts, pumps, rotating tube delivery systems (e.g., auger screws), or other typical forms of conveyance.

At optional step 204 and according to some embodiments, the system separately provides a chilling process to the ingredient water and/or oil. The chilling process may be some form of temperature-controlled process for chilling or refrigerating the water and/or oil, either in-line (i.e., concurrently to the water and/or oil being conveyed) or in-reservoir (such as by providing a chiller and jacket around a water and/or oil reservoir).

At step 206, concurrently to the ingredients being conveyed through the facility, and optionally after a chilling process is provided to the water in step 204, the system hydrates one or more forms of protein. In some embodiments with multiple forms of protein, each form of protein can be hydrated through the same machine, while in other embodiments, each form of protein is hydrated through a separate machine. In some embodiments, not all of the one or more forms of protein are hydrated.

In some embodiments, the hydration process may involve a process of progressive hydration. A hydrator may function to provide water which hydrates new surface areas of the protein which are exposed during agitation and/or particle size reduction of the protein. In some embodiments, the water may be provided via one or more metered water ports, which are configured to provide water for hydrating the protein as it is conveyed along the conveyance chamber. The water may be metered according to any number of methods, including directly via a valve feeding into the hydrator, or through pump pressure or upstream flow controls. In some embodiments, the water is metered according to a predefined hydration curve specific to the material.

In some embodiments, the hydration process includes or is concurrent to one or more processing methods or processes. The protein can be processed into smaller protein particles in this fashion while the hydration of the protein occurs. In various embodiments, the processing may include one or more of the following: shredding, shearing, fracturing (e.g., initially fracturing in order to homogeneously decrease particle size), and/or metered expulsion. In various embodiments, the processing may additionally or alternatively include one or more of the following: chopping, extruding (e.g., dispersion of water for powdered material, such as an auger pushing through a die), crushing, grinding, breaking, slicing, homogeneously processing, inhomogeneously processing, pulverizing, homogeneously mixing, tearing, scission, mincing, pulling, macerating, smearing, uniformly disseminating water, enhancing the mobility of water through the material for full dissemination, or any other suitable processing method.

At optional step 208 and according to some embodiments, concurrently to the ingredients being conveyed through the facility, and optionally after a chilling process is provided to the water and/or the oil in step 204, the system mixes two or more of the oil, water, and one or more binding agent(s). In some embodiments, step 208 comprises mixing the oil and water in predefined amounts (or via matched continuous flow rates) to form an oil-water suspension. In some embodiments, this oil-water mixing may be seen as a "dropletizing" and/or "dispersing" stage prior to a later mixing stage. In some embodiments, a continuous-flow mechanical pump dropletizes the oil in the water.

In other embodiments, optional step 208 comprises mixing the oil and one or more binding agent(s) to form a slurry, in which the one or more binding agent(s) are dispersed or suspended homogeneously within the oil. In some embodiments, this oil-binding agent(s) mixing may be performed in a reservoir, with a continuous mixer (such as, e.g., a homogenizer or high-speed blender) to maintain suspension, and the resulting slurry pumped out to provide to step 210. In some embodiments, the oil-binding agent(s) mixing may be performed continuously in-line, via matched flow rates of ingredients and an in-line passive or active mixer, then provided to step 210.

At step 210, concurrently to the ingredients being conveyed through the facility, and optionally in some embodiments after mixing one or more of the oil, water, and one or more binding agent(s) in step 208, the system emulsifies the oil, water, and one or more binding agent(s) in an emulsifying machine to form a final emulsion. In some embodiments, the binding agent(s) may include methylcellulose, citrus fiber, or some other binding agent capable of binding or stabilizing.

In some embodiments, the emulsification is performed in a machine which applies shear stress and turbulent mixing to the fluids passing through (e.g., the oil, water, and one or more binding agent(s)) via high-speed rotation of elements composed of intermeshing blunt "teeth", such as, e.g., a colloid mill. Such a machine may have multiple stages to refine the emulsion.

In other embodiments, the emulsification is performed in a progressive emulsifying machine by applying shear stress to the fluids passing through (e.g., the oil, water, and the one or more binding agent(s)). This is caused by movement of the progressive emulsifying machine along a fluid passage to create shear stresses in the fluids. In some embodiments, movement can be rotational, such as by rotating an inner body within a stationary outer body of the progressive emulsifying machine. In some embodiments, the progressive emulsifying machine may consist of multiple stages, wherein turbulence is provided in the transition between stages.

In some embodiments, the emulsifying machine may be actively cooled, such as with a jacketed region around the material processing region to accommodate continual coolant flow.

In traditional arrangements, the function performed by the emulsifying machine has been accomplished using a bowl chopper. It is generally accepted practice that an industrial bowl chopper must operate on a given batch of foodstuff for six minutes or more to achieve a suitable level of emulsification. In addition to this inefficient length of time, substantial cooling methods are needed to counteract the undesirable rise in temperature due to the lengthy frictional operation of the bowl chopper. However, due to the large volume of foodstuff in the batch, jacket cooling and even chilled air cooling have been shown to have little chilling effect.

At step 212, concurrently to the ingredients being conveyed through the facility, the system mixes the emulsion from step 210 in a final mixer with the fully hydrated and processed proteins from step 206 to form a mixed dough. At this point, the emulsion represents the oil-water-binding agent emulsion that has formed at the end of the emulsifying process of step 210. Due to the previous steps, the ingredients are provided in a continuous or near-continuous flow (or, alternately, in small continuous or metered doses) as the emulsification process of step 210 proceeds. The final mixer, rather than mixing large batches (e.g., 50 or 200 pounds at a time as done in a bowl chopper) of material, mixes in the proteins and emulsion (and, in some embodiments, additional ingredients) in a continuous or near-continuous manner. As a result of less work being performed on smaller volumes (instead of large batches) during different stages (as seen throughout the overall process) as well as chilling methods which occurred in previous steps, the final dough temperature is suitable for further processing without requiring a refrigerated environment. In some embodiments, the final mixer may be further actively cooled, such as with a jacket surrounding the processing area through which coolant continually flows.

The final mixer is configured to convey the dough while mixing it at the same time. In some embodiments, the conveyance tool of the final mixer includes incongruities such that the material is conveyed along, then is conveyed back to be mixed at the point of incongruity, then proceeds to be conveyed forward once more. The end result is a mixed dough at the end of the process.

In some embodiments, the final mixer is a twin-screw continuous mixer. In other embodiments, the final mixer is a single-shaft mixing auger.

In some embodiments, in addition to hydrated protein and emulsion, dry powder is added to the final mixer. The powder addition is metered through a continuous volumetric or gravimetric feeder. In some embodiments, the powder may be a mix of foodstuffs including, e.g., powdered vegetable protein, seasonings, binding agent(s). In some embodiments, the powder may be metered via a feeder which feeds while concurrently mixing together multiple powdered foodstuffs. In some embodiments, individual powdered foodstuffs may be continuously fed into such a mixer feeder, metered via additional volumetric or gravimetric feeders.

In some embodiments, the mixed dough is further conveyed to other components which may, e.g., form the mixed dough into a chicken nugget, burger patty, or other suitable shape or form as desired. Additional components may fry, pack, package, and freeze the material. The end result may be a final end product constituting a meat analogue or plant-based meat product, or other suitable end product as desired.

Figure 3:
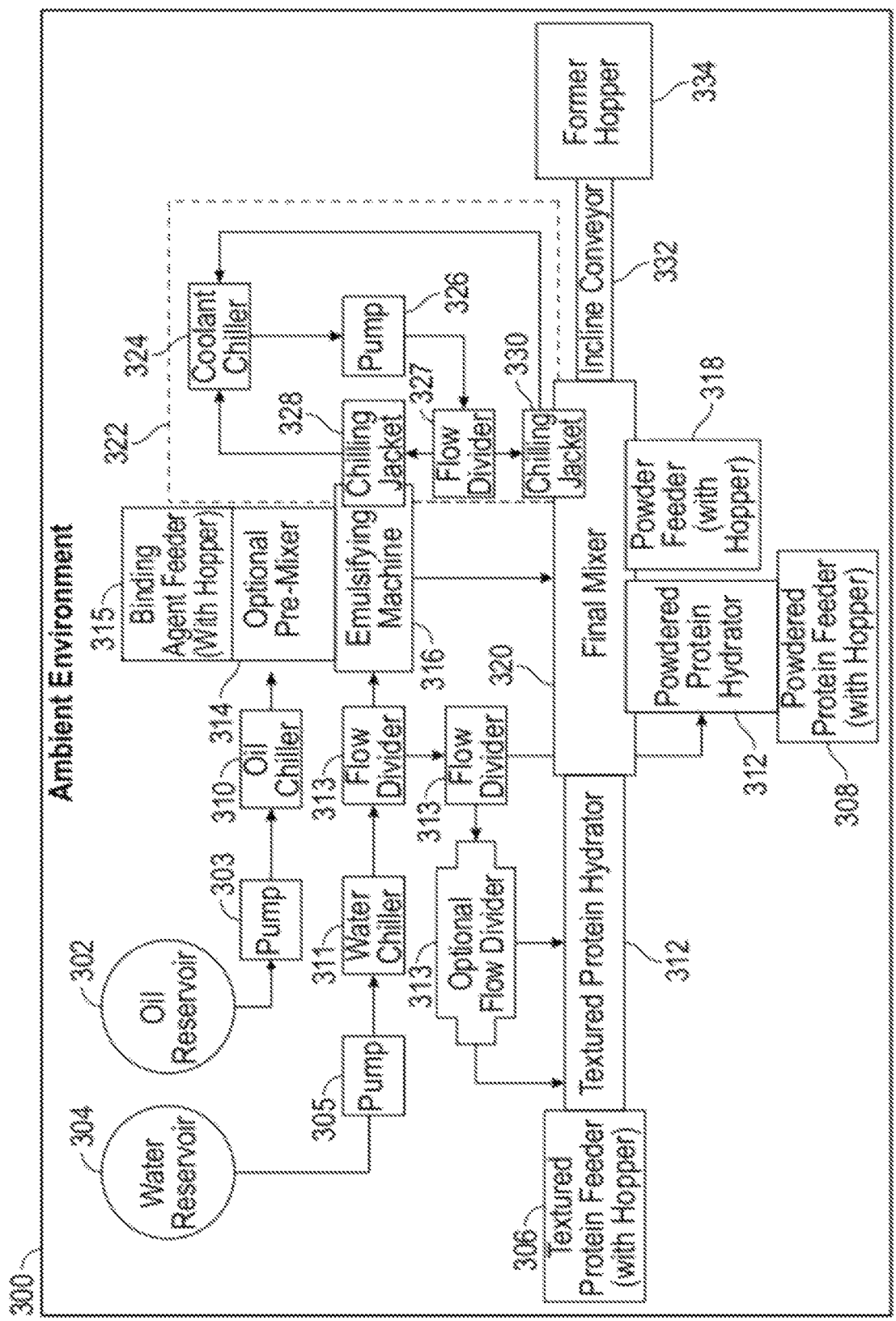
FIG. 3 illustrates a system diagram of an example system for providing automated meat analogue production.

FIG. 3 illustrates a system diagram of an example system 300 for providing automated meat analogue production. The system diagram shows an example of a food production system according to the new process for producing meat analogues, as described above with respect to FIG. 2.

Oil reservoir 302 may hold the oil, such as canola oil or vegetable oil, in a reservoir, tank, or other container. In some embodiments, a pump 303 introduces the oil from the oil reservoir to an oil chiller 310 as described above. In some embodiments the oil is provided to the chiller in a fully or nearly continuous flow, while in other embodiments the oil is provided in metered doses. In some embodiments the oil flow is metered via pump controls; in others, the oil is pumped to a flow regulator or dosing apparatus, which may be used to provide a fully continuous or near-continuous flow of oil (or alternately, specific dosed amounts of the oil) into an optional pre-mixer 314 or directly into the emulsifying machine 316. Concurrently, in some embodiments a water reservoir 304 similarly contains water separately from the oil and other ingredients. In some embodiments, the water may be instead provided directly to the system via facility plumbing from standard municipality water (without necessity of a reservoir). In some embodiments, a pump 305 introduces the water to a water chiller 311, as described above. One or more flow dividers 313 may then continuously divide the water flow into one or more protein hydrators 312 as well as into an optional pre-mixer 314 and/or emulsifying machine 316. In some embodiments, water is instead provided to the optional pre-mixer 314 and/or emulsifying machine 316 via a dosing apparatus which can dose specific amounts of water.

Binding agent feeder 315 provides the one or more binding agent(s) to optional pre-mixer 314 and/or emulsifying machine 316, in a continuous metered fashion. Feeder 315 may be a gravimetric or volumetric continuous feeder, as described above. In some embodiments, feeder 315 may be a vibratory or screw feeder. In some embodiments, the one or more binding agent(s) are fed separately, each with its own feeder 315.

In some embodiments, the optional premixer 314 mixes together two or more of the oil, water, and one or more binding agent(s). In some embodiments, the optional pre-mixer 314 mixes together the water and oil in a specific, predefined ratio to form an oil-water suspension, as described above. In other embodiments, the optional pre-mixer 314 mixes together the oil and one or more binding agent(s) in a specific, predefined ratio to form a slurry, as described above. The resulting liquid pre-mix is then conveyed to an emulsifying machine 316.

Concurrently to the processes for oil and water, multiple separate forms of proteins undergo a process as well. In this example, a textured protein feeder 306 functions to control the rate of the textured protein added to a textured protein hydrator 312, which is described above in relation to the protein hydration process. Flow dividers of water may provide metered flows of water to the hydrator to hydrate the protein. Similarly, a powdered protein feeder 308 controls the rate of powdered protein added to a powdered protein hydrator 312, as described above. In some embodiments, the hydrators also provide chopping, shearing, or other forms of processing to the protein to produce smaller protein particles. In some embodiments, additional hydrators may be present to hydrate additional proteins. In some embodiments, only one hydrator may be present. The multiple hydrated forms of protein are funneled separately into the final mixer 320.

The resulting emulsified and hydrated ingredients are fed into a final mixer 320; in some embodiments dosed via a material-holding hopper, in others continuously flowing through an inlet such as, e.g., a simple funnel. The final mixer 320 mixes the prepared ingredients in a fully or nearly continuous flow to create a dough. In some embodiments, the final mixer 320 simultaneously mixes and conveys the emulsified ingredients. In some embodiments, the final mixer is a continuous twin-screw mixer which is oriented horizontally. In other embodiments, the final mixer is a mixing auger which may be angled upwards.

In some embodiments, in addition to the emulsified and hydrated ingredients, one or more powder(s) are fed into the final mixer 320 via powder feeder 318. The one or more powder(s) could include, e.g., flavorings, powdered protein, or additional binding agent(s). In some embodiments, the one or more powder(s) may be separately dispensed via additional feeders 318. In some embodiments, the one or more powder(s) may be separately dispensed via additional feeders into a mixing feeder 318, which dispenses the powder mixture into final mixer 320.

In some embodiments, the mixed dough is conveyed directly or via interim conveyance equipment into the hopper of a forming machine, wherein the dough can further be formed and have other production tasks applied to it. In the example shown, the mixed dough is provided via an incline conveyor 332 to former hopper 334.

In some embodiments, an equipment chilling system 322 chills key pieces of equipment during processing. Coolant chiller 324 chills coolant (such as, e.g., food-grade glycol mix), which is pumped via pump 326 into flow divider 327. Flow divider 327 provides coolant to chilling jacket 328, which chills the emulsifying machine 316; and to chilling jacket 330, which chills the final mixer 320. The resulting warmed coolant recirculates to coolant chiller 324 to be re-chilled. In other embodiments, additional equipment (such as, e.g., the hydrator(s) 312, or ingredient feeders such as feeder 315 and 318) may be cooled by circulating coolant through additional chilling jackets.

Figure 4:
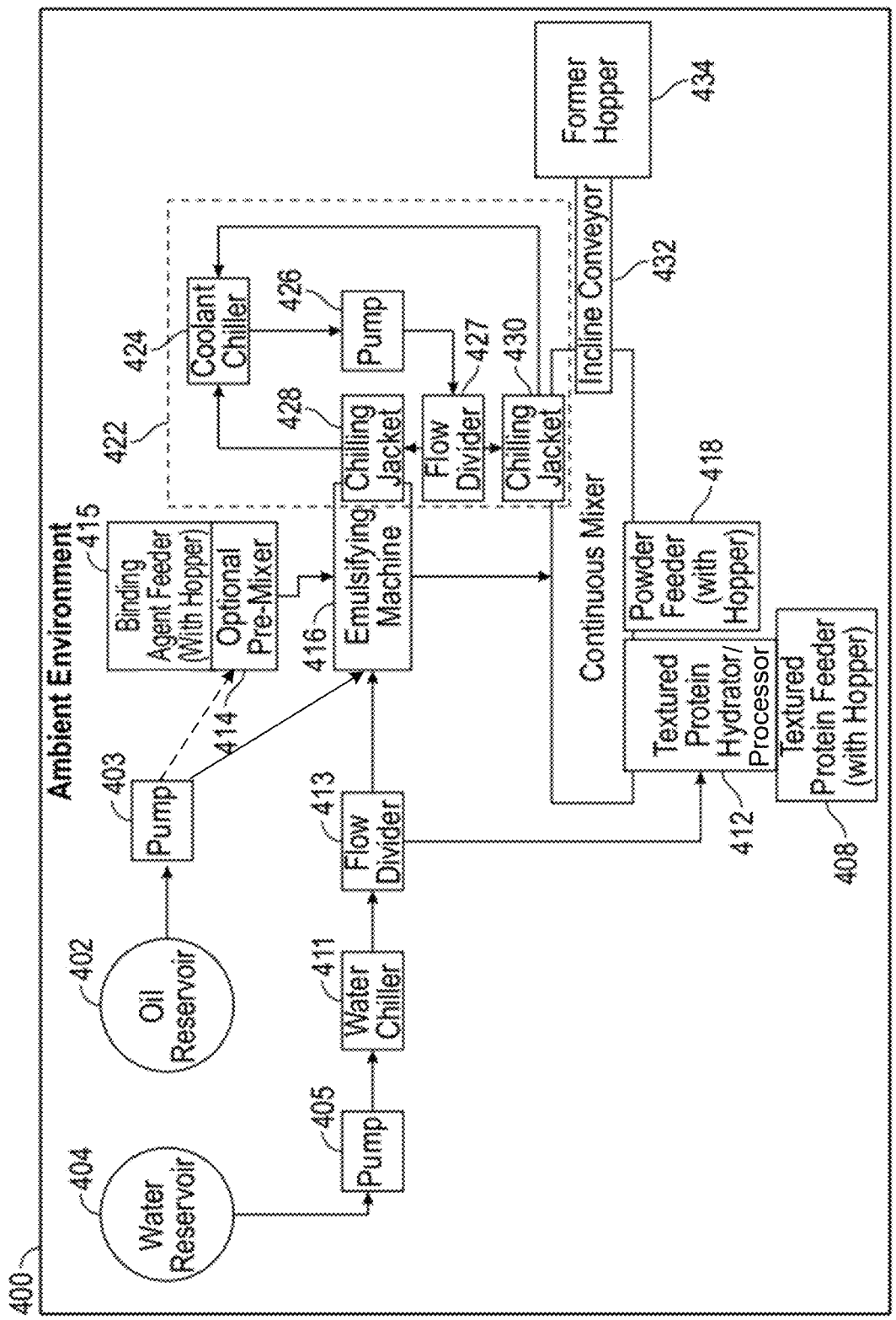
FIG. 4 illustrates a system diagram of an alternative example system for providing automated meat analogue production.

FIG. 4 illustrates a system diagram of a second embodiment of the system for providing automated meat analogue production, according to the new process for producing meat analogues, as described above with respect to FIG. 2.

Oil reservoir 402 may hold the oil, such as canola oil or vegetable oil, in a reservoir, tank, or other container. In some embodiments, a pump 403 flows the oil into an optional pre-mixer 414; in other embodiments, the oil is added directly into an emulsifying machine 416. In some embodiments, the oil flow is metered via pump controls; in others, the oil is pumped to a flow regulator or dosing apparatus, which may be used to provide a fully continuous or near-continuous flow of oil (or alternately, specific dosed amounts of the oil).

Concurrently, in some embodiments a water reservoir 404 similarly contains water separately from the oil and other ingredients. In some embodiments, the water may be instead provided directly to the system via facility plumbing from standard municipality water (without necessity of a reservoir). In some embodiments, a pump 405 introduces the water to a water chiller 411, as described above. Flow divider 413 then divides the water flow into protein hydrator 412 as well as the emulsifying machine 416.

In the embodiment shown, one or more binding agents are continually fed into the optional pre-mixer 414 via a feeder 415. Optional pre-mixer 414 then mixes together the oil and binding agent(s) in a specific, predefined ratio to form an oil-binder suspension. This oil-binder suspension is then pumped into the emulsifying machine 416.

Binding agent feeder 415 provides the one or more binding agent(s) to optional pre-mixer 414 and/or emulsifying machine 416, in a continuous metered fashion. Feeder 415 may be a gravimetric or volumetric continuous feeder, as described above. In some embodiments, feeder 415 may be a vibratory or screw feeder. In some embodiments, the one or more binding agent(s) are fed separately, each with its own feeder 415.

In the embodiment shown in FIG. 4, the optional pre-mixer 414 mixes together the oil and one or more binding agent(s) in a specific, predefined ratio to form a slurry, as described above. The resulting slurry is then pumped or otherwise conveyed to an emulsifying machine 416.

Concurrently to the processes for oil and water binding, one or more forms of proteins undergo a process as well. In this example, a protein feeder 408 functions to control the rate of the protein added to a protein hydrator 412, which is described above in relation to the protein hydration process.

Feeder 408 may control the flow of the protein via volumetric or gravimetric controls. In some embodiments, feeder 408 may be a vibratory or screw feeder. Flow dividers of water may provide one or more metered flows of water to the hydrator to hydrate the protein. In some embodiments, the hydrator also provides chopping, shearing, or other forms of processing to the protein to produce smaller protein particles. In some embodiments, the protein may be a mixture of multiple varieties, such as, e.g., soy, wheat, pea protein, fed in together or via additional separate feeders such as feeder 408, hydrated together in one hydrator 412. In some embodiments, the protein is low-moisture-extruded textured vegetable protein; the protein may also be powdered protein. In some embodiments, multiple feeders 408 and hydrators 412 may be included to concurrently hydrate and/or process multiple varieties of protein. The hydrated protein from hydrator(s) 412 is funneled separately into the final mixer 420; or funneled into a conveyance auger (not shown), which combines the hydrated proteins together and feeds into a final mixer 420.

A powder feeder 418 controls the rate of one or more powders added to the final mixer 420. Feeder 418 may control the flow of the powder(s) via volumetric or gravimetric controls. In some embodiments, feeder 418 may be a vibratory or screw feeder. In some embodiments, the one or more powders may be a mixture of multiple foodstuffs, such as, e.g., seasonings, protein powder, one or more binding agents. In some embodiments, this protein powder may be a mixture of multiple varieties, such as, e.g., soy, wheat, pea protein, fed into the final mixer 420 together, or via additional separate feeders such as feeder 418. In some embodiments, feeder 418 may actively mix the powders before or during feeding into the final mixer 420. Multiple foodstuff powders may be fed into a mixing feeder 418 via additional similar continuous feeders. In some embodiments, the various powders may be fed separately and directly into the final mixer 420 (via feeders such as feeder 418).

Concurrently to the powder(s), the hydrated protein and final oil-water-binder emulsion are dosed or continuously fed into the final mixer 420, which mixes these ingredients in a fully or nearly continuous flow to create a dough. In some embodiments, the final mixer 420 simultaneously mixes and conveys the dough. In some embodiments, the final mixer 420 is a twin screw continuous mixer; in others, final mixer 420 is a single-shaft mixing auger. In the embodiment shown in FIG. 4, the mixed dough is conveyed via an incline conveyor 432 into the hopper of a forming machine 434, wherein the resulting mixed dough can further be formed and have other production tasks applied to it.

In some embodiments, analog and/or digital sensors may be integrated throughout the processing system, such that process metrics such as liquid flow rates, dry material flow rates, pressure, and temperature may be continually monitored and recorded in a digital system. In further embodiments, controls may be integrated throughout the processing system, such that process requirements and metrics such as ingredient or coolant liquid flow rates, dry material flow rates, pressure, and temperature may be continually controlled by a digital system, in an automated and/or manual fashion. Additionally, barcode scanning or other material lot code tracking methods may be integrated with this monitoring and/or control system, such that final dough output is correlated with particular times and/or batches of raw ingredients added to the feeder hoppers.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An automated meat analogue production system, comprising:
   a hydrator configured for hydrating a first set of one or more foodstuff ingredients to form hydrated foodstuff particles while simultaneously conveying the hydrated foodstuff particles toward another system component; and
   a mixer configured for mixing the hydrated foodstuff particles with a separate emulsion to form a meat analogue dough while simultaneously conveying the meat analogue dough toward another system component.

2. The automated meat analogue production system of claim 1, wherein the hydrator and the mixer are configured for operating simultaneously and continuously to form the meat analogue dough that is continuously output from the mixer.

3. The automated meat analogue production system of claim 1, wherein the hydrator is further configured for processing the hydrated foodstuff particles into smaller hydrated foodstuff particles while simultaneously hydrating and conveying.

4. The automated meat analogue production system of claim 1, wherein the hydrator includes a material passage.

5. The automated meat analogue production system of claim 4, wherein the material passage includes an inner shaft that rotates to convey the hydrated foodstuff particles.

6. The automated meat analogue production system of claim 1, wherein the hydrator is configured for hydrating the first set of one or more foodstuff ingredients progressively as it conveys the hydrated foodstuff particles.

7. The automated meat analogue production system of claim 1, further comprising:
   an emulsifying machine configured for emulsifying two or more different foodstuff ingredients that are not in the first set of foodstuff ingredients to form the separate emulsion while simultaneously conveying the separate emulsion toward another system component.

8. The automated meat analogue production system of claim 7, further comprising:
   a pre-mixer configured for mixing the two or more different foodstuff ingredients to form a slurry while simultaneously conveying the slurry toward another system component.

9. The automated meat analogue production system of claim 7, further comprising:
   one or more chilling components configured to chill the hydrator, the mixer, the emulsifying machine, or any combination thereof.

10. The automated meat analogue production system of claim 1, further comprising:
    a forming machine configured to form the meat analogue dough into a meat analogue chicken nugget, meat analogue burger patty, or other meat analogue product.

11. A system configured for the continuous production of a meat analogue product, the system comprising:
    a mixer configured to mix hydrated foodstuff particles with a separate emulsion to form a meat analogue dough while simultaneously conveying the meat analogue dough toward another system component;

an emulsifying machine configured to emulsify foodstuff ingredients together to form the separate emulsion while simultaneously conveying the separate emulsion toward the mixer; and a hydrator configured to hydrate one or more foodstuff ingredients that are not in the separate emulsion to form the hydrated foodstuff particles while simultaneously conveying the hydrated foodstuff particles toward the mixer.

12. The system of claim 11, wherein the mixer, the emulsifying machine, and the hydrator are all configured to operate simultaneously and continuously to form the meat analogue dough that is continuously output from the mixer.

13. The system of claim 11, wherein the foodstuff ingredients that are emulsified together to form the separate emulsion include oil, water, and one or more binding agents, and the one or more foodstuff ingredients that are hydrated include at least one form of protein.

14. The system of claim 11, wherein the mixer includes incongruities that cause materials therein to be conveyed forward, then backward to be mixed, then forward again.

15. A system configured to process meat analogue materials, the system comprising:

a hydrator configured to hydrate foodstuff ingredients to form hydrated foodstuff particles while simultaneously conveying the hydrated foodstuff particles toward, a mixer configured to mix the hydrated foodstuff particles with a separate emulsion to form a meat analogue dough while simultaneously conveying the meat analogue dough toward another system component, wherein the hydrator includes:

a material passage configured for the conveyance of the foodstuff ingredients and hydrated foodstuff particles therethrough, an inner shaft located within the material passage, wherein the inner shaft includes one or more progression features and is configured to rotate to convey the foodstuff ingredients and hydrated foodstuff particles through the material passage, and water ports configured to provide water into the material passage as the foodstuff ingredients and hydrated foodstuff particles are conveyed therethrough.

16. The system of claim 15, wherein the material passage includes an exterior tube.

17. The system of claim 15, wherein the hydrator further includes particle resizing features configured to process the hydrated foodstuff particles into smaller hydrated foodstuff particles while simultaneously hydrating and conveying.

18. The system of claim 17, wherein the particle resizing features extend from the inner shaft.

19. The system of claim 17, wherein the material passage includes an exterior tube and the particle resizing features extend from the exterior tube.

* * * * *